Figure 7:
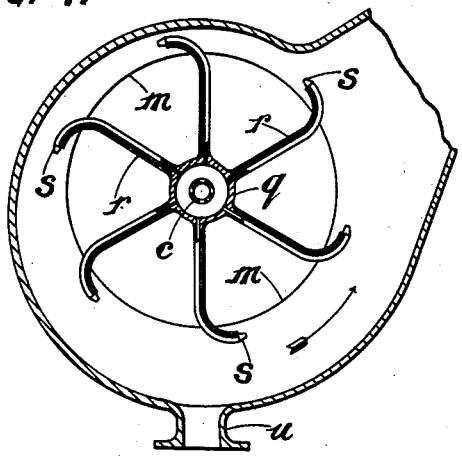

G. LISTER.
APPARATUS FOR WASHING SMOKE, AIR, AND OTHER GASES.
APPLICATION FILED AUG. 18, 1913.
1,098,389.
Patented June 2, 1914.
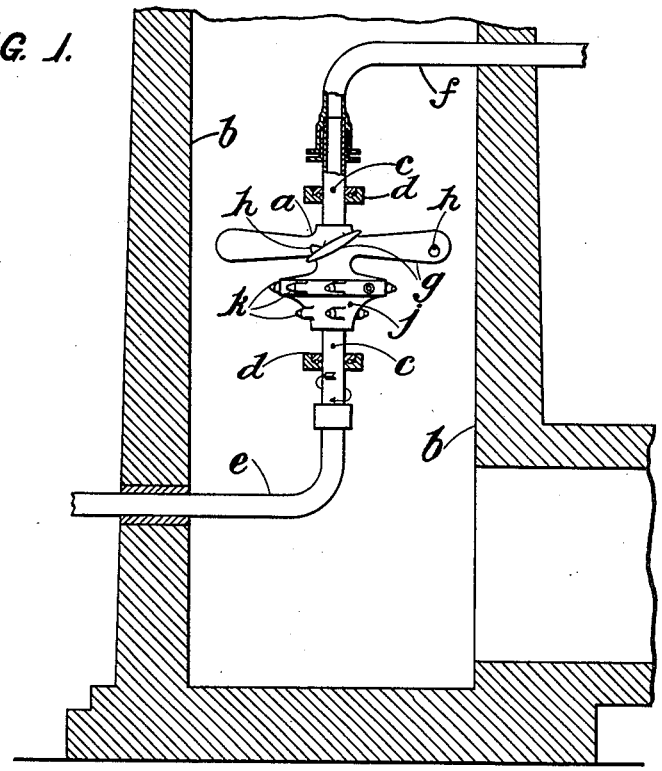
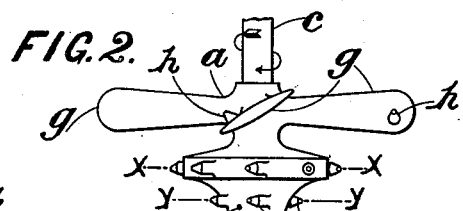
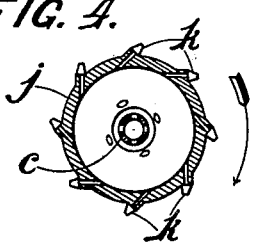
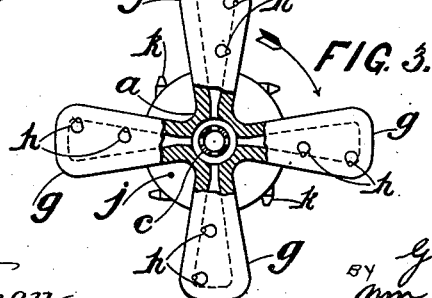
WITNESSES:
John C. Sanders
Albert F. Heuman
INVENTOR:
George Lister
BY Wm Wallace White
ATTY

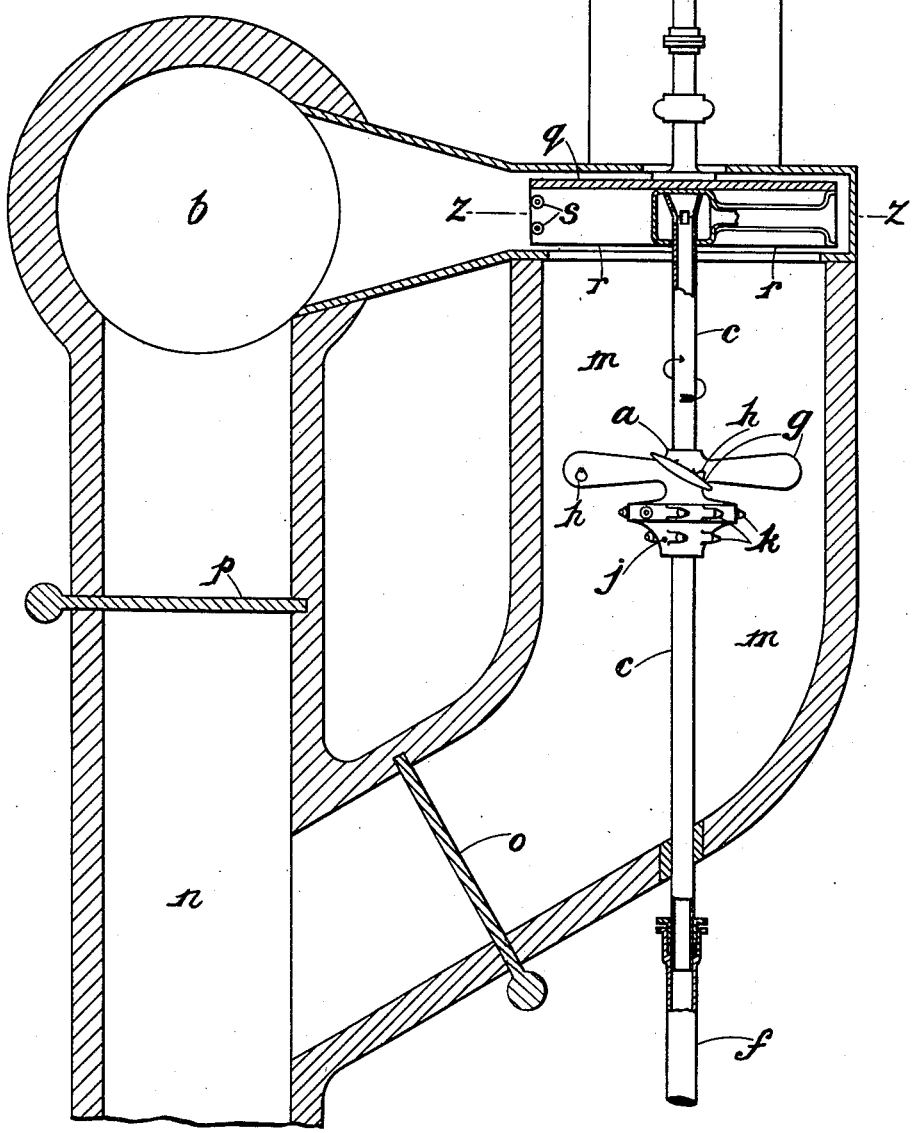

G. LISTER.
APPARATUS FOR WASHING SMOKE, AIR, AND OTHER GASES.
APPLICATION FILED AUG. 18, 1913.

1,098,389.

Patented June 2, 1914.

3 SHEETS—SHEET 3.

WITNESSES:
John C. Sanders
Albert F. Heuman

INVENTOR:
George Lister
BY Wm Wallace White
ATTY

UNITED STATES PATENT OFFICE.

GEORGE LISTER, OF TOW LAW, ENGLAND.

APPARATUS FOR WASHING SMOKE, AIR, AND OTHER GASES.

1,098,389.  Specification of Letters Patent.  Patented June 2, 1914.

Application filed August 18, 1913. Serial No. 785,253.

*To all whom it may concern:*

Be it known that I, GEORGE LISTER, a subject of the King of Great Britain and Ireland, residing at Tow Law, in the county of Durham, England, have invented new and useful Improvements in Apparatus for Washing Smoke, Air, and other Gases, of which the following is a specification.

This invention relates to apparatus for washing or extracting soot, dust and other impurities from smoke, air and other gases, and particularly to that type of apparatus which consists of a rotary water distributer arranged in the chimney or the like through which the smoke, air or gas passes, and adapted to also act as a fan to impel the smoke or air. The combined distributer and fan is supplied with water which is discharged therefrom in the form of spray through which the smoke passes, the soot and other impurities in the smoke being washed out by the water. Combined water distributers and fans of this type have been provided with orifices delivering jets of water in the direction of rotation but hitherto the orifices have been disposed between the blades and it has been found necessary to supply air to the interior of the combined distributer and fan to overcome the vacuum or "hanging" effect produced by the centrifugal force developed in a rapidly revolving distributer.

The object of the present invention is to provide an improved and efficient construction of smoke washing apparatus of the type referred to having its water orifices or nozzles so arranged as to avoid the vacuum or "hanging" effect and overcome the necessity for supplying air to the interior of the combined distributer and fan.

According to this invention I employ a rotary water distributer adapted to also act as a fan to impel the smoke, air or gas, and I arrange the spraying nozzles or the like upon the leading face or edge of the blades so that the water issues tangentially in the direction of rotation of the distributer, and I also preferably combine with the combined distributer and fan a deflector for deflecting the smoke, air or gas outward away from the driving shaft of the distributer, said deflector being also supplied with water and provided with spraying nozzles or the like so formed and arranged that they lead the water in a tangential direction from the interior of the deflector and deliver same in the direction of rotation.

I will fully describe my invention with reference to the accompanying drawings wherein—

Figure 8:
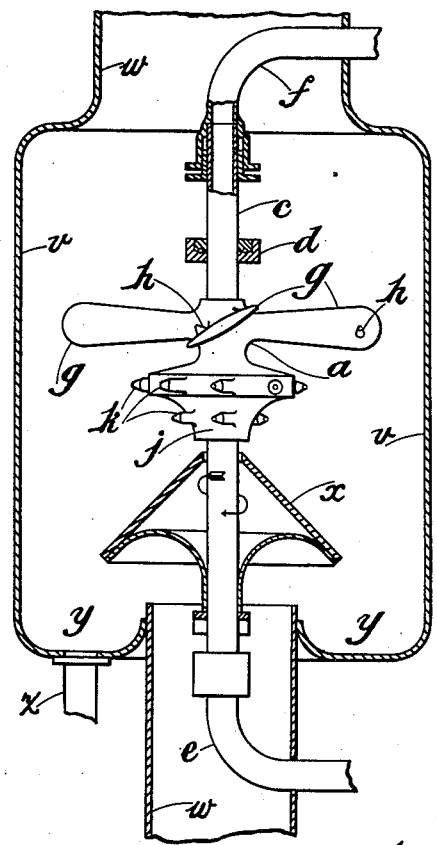

Figure 1 is a vertical section of the chimney or uptake of a boiler or other furnace fitted with one form of my improved apparatus; Fig. 2 is an enlarged view of the combined rotary distributer and fan shown in Fig. 1; Fig. 3 is a plan of Fig. 2; Figs. 4 and 5 are sectional plans on the lines X—X and Y—Y respectively in Fig. 2; Fig. 6 is a sectional plan illustrating a modified arrangement of the apparatus; Fig. 7 is a section on the line Z—Z in Fig. 6; and Fig. 8 is a vertical section through the funnel or uptake of a marine boiler showing my improved apparatus fitted thereto.

Referring to Figs. 1 to 5 of the drawings, $a$ is a fan of the screw type arranged at a suitable point in the chimney or uptake $b$ and mounted on a shaft $c$. The shaft $c$ is mounted in bearings $d$ and is adapted to be rotated through the medium of a flexible shaft $e$ or equivalent means by any convenient means situated outside of the chimney $b$. The shaft $c$ is hollow for a portion of its length and is connected by a pipe $f$ to a suitable water supply. The blades or vanes $g$ of the fan $a$ are also hollow and communicate with the hollow portion of the shaft $c$ and are provided with spraying nozzles $h$, preferably of the kind which deliver conical jets, arranged at or on their leading faces or edges so that the jets of spray issue tangentially in the direction of rotation which is indicated by an arrow in each figure. Each blade or vane $g$ may be provided with only a single spraying nozzle or with two or more nozzles as desired.

Below the blades or vanes $g$ I arrange a deflector $j$ for deflecting the smoke outward from the shaft $c$ and toward the blades or vanes $g$. The deflector $j$ is hollow and communicates with the hollow portion of the shaft $c$ and is provided with one or more rows of spraying nozzles $k$. As shown best in Figs. 4 and 5, the nozzles $k$ are formed and arranged so that the water is led from the interior of the deflector approximately in a direction at a tangent to the direction of rotation of same and delivered from said nozzles or the like in the direction of rotation.

It is essential in order to obtain an efficient washing action, that the nozzles $h$ and $k$ should be so arranged that the jets of water issue therefrom in the direction of the rotation of the fan $a$ and deflector $j$ and at a tangent to the circle described by the tips of the fan blades $g$ or the periphery of the deflector $j$ so that the centrifugal force developed by the rapidly revolving fan and deflector assists in the projection of the jets, and the back pressure, vacuum or "hanging" effect which would be developed if the nozzles were arranged to deliver the jets rearwardly is thus prevented.

Instead of arranging the apparatus in the chimney or uptake $b$, I may, as shown in Fig. 6, arrange it in a passage or chamber $m$ communicating with the flue $n$ and the chimney or uptake $b$. Dampers $o, p$ are provided for directing the smoke either through the passage $m$ or direct to the chimney $b$, as desired. In this arrangement I preferably combine with the rotary distributer and fan $a$ a second apparatus comprising a centrifugal fan $q$ (Figs. 6 and 7) having its blades or vanes $r$ adapted to be supplied with water from the hollow shaft $c$ and fitted with spraying nozzles $s$ adapted to deliver the water tangentially in the direction of rotation. The fan $q$ delivers the washed smoke into the chimney or uptake $b$, and it and the shaft $c$ may conveniently be driven by an electric motor $t$. The water sprayed by the centrifugal fan $q$ is drawn off from the casing thereof by an outlet $u$ for filtration or other treatment to recover the soot, tar, etc.

If desired the chimney $b$ or chamber $m$ may be enlarged in the vicinity of the combined distributer and fan $a$ to allow more space for the diffusion of the water sprayed therefrom.

In applying my improved apparatus to the funnel or uptake of a marine boiler, I preferably employ apparatus similar to that shown in Fig. 1 and above described, and arrange it as shown in Fig. 8 in a chamber $v$ in the funnel or uptake $w$ and provide a baffle $x$ for directing the water into an annular trough $y$ whence it is drawn off by a pipe $z$.

As will be obvious my improved apparatus is also applicable to the cleaning or washing of air and other gases, and to the extraction of coal and other dust in mines and other places.

What I claim and desire to secure by Letters Patent is:—

1. In apparatus for washing smoke, air and other gases, the combination of a conduit through which the smoke, air and gases pass, a rotary fan arranged in said conduit, said fan being provided with hollow blades, means for supporting said fan in position, means for rotating said fan, means for conveying fluid to the interiors of said hollow fan blades, and nozzles carried by said hollow fan blades communicating with the interiors thereof and so disposed as to project the fluid supplied thereto in the direction of rotation of said fan and at a tangent to the circle described by the tips of the fan blades.

2. In apparatus for washing smoke, air and other gases, the combination of a conduit through which the smoke, air and gases pass, a rotary fan arranged in said conduit, said fan being provided with hollow blades, means for supporting said fan in position, means for rotating said fan, means for conveying fluid to the interiors of said hollow fan blades, nozzles carried by said hollow fan blades communicating with the interiors thereof and so disposed as to project the fluid supplied thereto in the direction of rotation of said fan and at a tangent to the circle described by the tips of the fan blades, a hollow rotary deflector, means for supplying fluid thereto, and nozzles communicating with the interior thereof and so disposed as to project the fluid supplied thereto in the direction of rotation of said deflector and at a tangent to the periphery thereof.

In testimony whereof I have signed my name to this specification in the presence of two subscribing witnesses.

GEORGE LISTER.

Witnesses:
 HERBERT HOWARD,
 GEORGE FORSTER.